(12) United States Patent
Juckel et al.

(10) Patent No.: US 8,844,326 B2
(45) Date of Patent: Sep. 30, 2014

(54) METHOD FOR OPERATING A METERING DEVICE, AND METERING DEVICE

(71) Applicant: Henkel AG & Co. KGaA, Duesseldorf (DE)

(72) Inventors: Thomas Juckel, Monheim (DE); Erik Brueckner, Hilden (DE); Noelle Wrubbel, Duesseldorf (DE); Markus Jungmann, Morfelden-Walldorf (DE); Juergen Stiller, Idstein (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/941,666

(22) Filed: Jul. 15, 2013

(65) Prior Publication Data

US 2013/0298613 A1  Nov. 14, 2013

Related U.S. Application Data

(63) Continuation of application No. PCT/EP2011/063220, filed on Aug. 1, 2011.

(30) Foreign Application Priority Data

Jan. 17, 2011 (DE) .......................... 10 2011 002 752

(51) Int. Cl.

| | | |
|---|---|---|
| *D06F 29/00* | (2006.01) | |
| *D06F 33/00* | (2006.01) | |
| *D06F 35/00* | (2006.01) | |
| *D06F 39/02* | (2006.01) | |
| *F16K 31/00* | (2006.01) | |
| *D06F 58/20* | (2006.01) | |
| *D06F 58/28* | (2006.01) | |
| *A47L 15/44* | (2006.01) | |

(52) U.S. Cl.
CPC ............ *F16K 31/002* (2013.01); *D06F 39/024* (2013.01); *D06F 58/28* (2013.01); *A47L 2501/07* (2013.01); *A47L 2401/18* (2013.01); *A47L 15/4445* (2013.01); *D06F 58/203* (2013.01)
USPC .......................................................... 68/12.18

(58) Field of Classification Search
CPC combination set(s) only.
See application file for complete search history.

(56) References Cited

U.S. PATENT DOCUMENTS

| | | | |
|---|---|---|---|
| 2003/0224965 A1 | 12/2003 | Conley et al. | |
| 2009/0223569 A1* | 9/2009 | Spinelli et al. .................. | 137/79 |

FOREIGN PATENT DOCUMENTS

| | | |
|---|---|---|
| DE | 102009006234 A1 | 8/2010 |
| WO | 2008/012613 A2 | 1/2008 |

* cited by examiner

*Primary Examiner* — Jason Ko
(74) *Attorney, Agent, or Firm* — Thomas G. Krivulka

(57) ABSTRACT

The invention relates to a method for operating a dispensing device (10, 110) for releasing an agent from the dispensing device (10, 110) in defined manner into a surrounding environment (15) of the dispensing device (10, 110), the dispensing device (10, 110) comprising: a reservoir unit (16, 116) for accommodating an agent to be dispensed and a valve unit (17, 117) for defined opening and closing of a valve passage (26, 29, 34, 126, 129, 134) from the reservoir unit (16, 116) into the surrounding environment (15) of the dispensing device (10, 110), opening and closing of the valve passage (26, 29, 34, 126, 129, 134) proceeding as a function of an ambient temperature profile of the dispensing device (10, 110) and the valve passage (26, 29, 34, 126, 129, 134) being opened when the ambient temperature falls and the ambient temperature is above a first and/or second defined minimum temperature.

7 Claims, 6 Drawing Sheets

METHOD FOR OPERATING A METERING DEVICE, AND METERING DEVICE

FIELD OF THE INVENTION

The present invention generally relates to a method for operating a dispensing device and to a dispensing device.

BACKGROUND OF THE INVENTION

Such a dispensing device is suitable in particular for use in a washer/dryer. The dispensing device is intended to release an agent to be dispensed onto laundry in the washer/dryer during the drying process. An agent to be dispensed may for example be a scent. Through the method for operating the dispensing device, release of the agent to be dispensed may be open- or closed-loop controlled. Use in a washing machine or dishwasher is however also conceivable.

A dispenser is known from WO 2008/012613 A2 for releasing a scent in a dishwashing machine. This dispenser comprises a receiving unit for accommodating a substance to be dispensed and a valve mechanism with variable orifices, through which the substance can escape into the surrounding environment. A temperature-sensitive element is provided, which may change its shape as a function of an ambient temperature. The temperature-sensitive element is arranged such that a temperature-related change in shape actuates the valve mechanism, in order to change the size of the orifices. The size of the orifice then depends substantially on the magnitude of the ambient temperature.

US 2009/0293923 A1 discloses a dispenser device for a cleaning agent, which may be introduced removably into a washing machine. Here a chamber is provided as a reservoir for accommodating cleaning agent. In addition, the device comprises means for detecting the presence of water in the surrounding environment. Pump means are provided for conveying the cleaning agent out of the chamber.

On this basis, it is the object of the present invention to provide an improved method for operating a dispensing device and a dispensing device. In this case, it is particularly desirable for the efficacy of such a dispensing device to be increased, which may in particular be expressed as the greatest possible effect being achieved while using as little agent to be dispensed as possible.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method for operating a dispensing device (10, 110), in particular a dispensing device (10, 110) suitable for use in a washer/dryer, it being possible to release an agent to be dispensed from the dispensing device (10, 110) in defined manner into a surrounding environment (15) of the dispensing device (10, 110), the dispensing device (10, 110) comprising: a reservoir unit (16, 116) for accommodating an agent to be dispensed, a valve unit (17, 117) for defined opening and closing of a valve passage (26, 29, 34, 126, 129, 134) from the reservoir unit (16, 116) into the surrounding environment (15) of the dispensing device (10, 110), opening and closing of the valve passage (26, 29, 34, 126, 129, 134) proceeding as a function of an ambient temperature (T) profile of the dispensing device (10, 110), wherein the valve passage (26, 29, 34, 126, 129, 134) is opened when the ambient temperature (T) falls and the ambient temperature (T) is above a first and/or second defined minimum temperature.

A dispensing device (10, 110), in particular suitable for use in a washer/dryer, it being possible to release an agent to be dispensed from the dispensing device (10, 110) in defined manner into a surrounding environment (15) of the dispensing device (10, 110), the dispensing device comprising a reservoir unit (16, 116), for accommodating the agent to be dispensed, a valve unit (17, 117) for defined opening and closing of a valve passage (26, 29, 34, 126, 129, 134) from the reservoir unit into the surrounding environment (15) of the dispensing device (10, 110), the valve unit (17, 117) comprising at least one first valve means (21, 121) which may be changed over between an unobstructed state and a closed state, and a control unit for controlling the valve unit (17, 117), the control unit comprising at least one thermosensitive actuator (39, 139) which is capable of bringing about a changeover of the first valve means (21, 121) as a function of an ambient temperature profile, wherein a friction clutch is arranged between the thermosensitive actuator (39, 139) and the first valve element (21, 121).

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
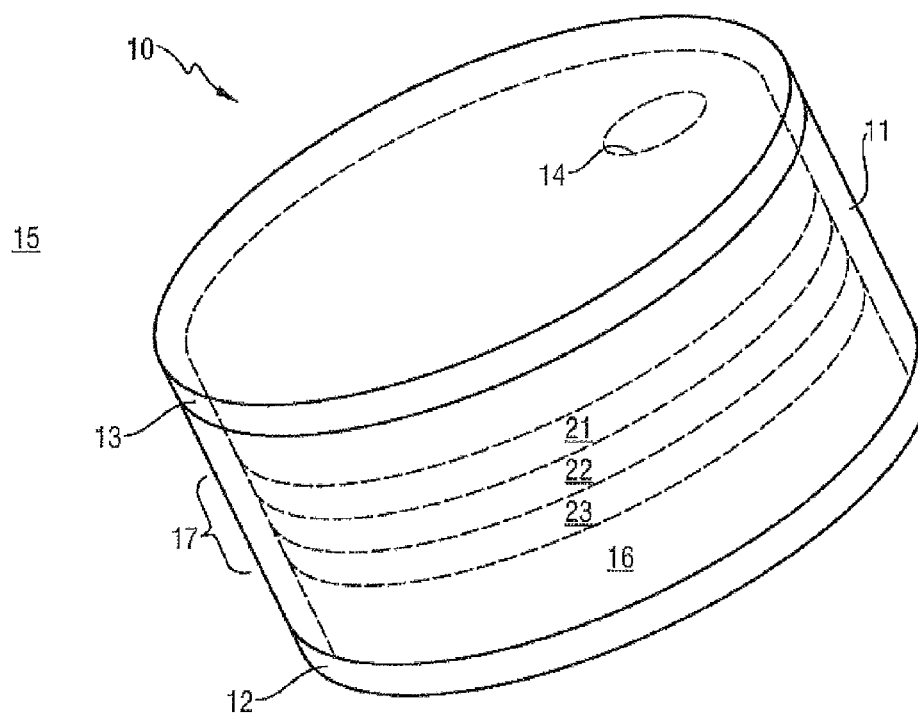
FIG. 1 is a perspective representation of a first embodiment according to the invention of the dispensing device.

The following detailed description of the invention is merely exemplary in nature and is not intended to limit the invention or the application and uses of the invention. Furthermore, there is no intention to be bound by any theory presented in the preceding background of the invention or the following detailed description of the invention.

The object underlying the invention is achieved by a method for operating a dispensing device, in particular a dispensing device suitable for use in a washer/dryer, it being possible to release an agent to be dispensed from the dispensing device in defined manner into a surrounding environment of the dispensing device, the dispensing device comprising: a reservoir unit, for accommodating an agent to be dispensed, and a valve unit for defined opening and closing of a valve passage from the reservoir unit into the surrounding environment of the dispensing device. Opening and closing of the valve passage proceeds as a function of an ambient temperature profile.

The method according to the invention is characterized in that the valve passage is opened when the ambient temperature falls and the ambient temperature is above a defined minimum temperature, namely in particular a first and/or a second minimum temperature.

By opening the valve passage when the ambient temperature drops, it is possible for agent to be dispensed to be released to the surrounding environment when the process in which the dispensing device is used is approaching completion. In washer/dryers or washing machines for example, first of all the temperature is increased up to an operating temperature, wherein the actual process, namely for example drying or washing of the laundry, takes place at the operating temperature. Output of agent to be dispensed is undesirable at this early stage, however, since said agent will be removed again from the laundry and optionally from the interior of the machine during further treatment by constant circulation of air or water. By opening the valve passage only when the ambient temperature falls, this unnecessary use of agent to be dispensed may be avoided. The further condition for opening, i.e. that a defined first and/or second minimum temperature must namely also prevail in the surrounding environment of the dispensing device, makes it possible to prevent unintentional opening of the valve passage with any and every fall in temperature.

A rise in ambient temperature is understood for the purposes of the present invention to be a defined increase in ambient temperature up to an operating temperature for the respective process, in particular a drying process. A fall in ambient temperature is understood for the purposes of the present invention to be a defined reduction in the ambient temperature from the operating temperature of the respective process. Any temperature fluctuations which may occur during operation are excluded therefrom. A temperature rise is, for instance, understood to mean a substantially uninterrupted increase in ambient temperature of at least 10° C., which takes place over a period of no more than 10 minutes. A temperature fall is, for instance, understood to mean a substantially uninterrupted decrease in ambient temperature of at least 10° C., which takes place over a period of no more than 10 minutes. Temperature changes with a lower average gradient are in particular not regarded as a rise or fall for the purposes of the present invention.

For the purposes of the present invention, ambient temperature is basically the temperature of the environment surrounding the dispensing device. If, for example, the dispensing device is located in a washer/dryer, then the temperature inside the washer/dryer is the ambient temperature.

The valve passage is preferably closed if the ambient temperature rises. In this way it is in principle possible to prevent agent to be dispensed from being released right at the start of a process. In this way, savings may be made in agent to be dispensed. In particular in a laundry drying process, the effect of agent to be dispensed may rapidly disappear if the agent to be dispensed is applied prematurely to the laundry to be dried. This applies extensively also for other processes.

The valve passage is preferably closed if the ambient temperature falls below a defined second minimum temperature. In this way, it is possible to ensure that, on completion of a process, for example on termination of a laundry drying process, the valve passage is closed. In this way, savings may be made in agent to be dispensed, since on completion of the process generally no more agent to be dispensed needs to be released onto the laundry.

The valve unit preferably comprises at least two valve means, namely at least one first and one second valve means, which may in each case be switched between an unobstructed state and a closed state, wherein the valve passage is closed by transfer of at least one of the valve means into the closed state. By providing two or indeed more valve means, it is possible to ensure a separation of functions within the valve unit. For instance, one valve means, in particular the first valve means, may be changed over between states as a function of changes in a temperature profile, preferably substantially independently of the absolute temperature. Another valve means, in particular the second valve means, may be changed over as a function of an absolute temperature. Through such a separation of functions, opening and closing of the valve passage may be effected simply as a function of different conditions, in particular both of the change in temperature and of the absolute temperature. Through the separation of functions, fine tuning of the valve unit may be simplified. The unobstructed or closed state may be brought about respectively by an unobstructed or closed position, wherein said positions differ from one another through different spatial positions or orientations of the valve means.

One of the valve means, in particular the first valve means, is preferably loaded into the closed state at least occasionally, in particular always, in the event of a rising ambient temperature. In this way, it is possible to ensure that the valve unit is closed at least occasionally, preferably always, in the event of rising ambient temperature.

Provision is preferably made for one of the valve means, in particular the first valve means, to be changed over into the unobstructed state only in the event of a falling ambient temperature. In this way it can be ensured that the valve passage is only opened when the process is approaching its end. Agent to be dispensed can thereby be used more efficiently.

One of the valve means, in particular the second valve means, is preferably only changed over into the unobstructed state when the ambient temperature is above a first defined minimum temperature. In this way, a temperature range can be defined within which the valve passage may be opened. Moreover, unintentional opening of the valve passage at low temperatures can be avoided.

If the temperature falls below a second defined minimum temperature, the second valve means is preferably changed over into the closed state, in particular always into the closed state. In this way, a temperature range can be defined within which the valve passage is in particular never intended to be opened. Loading the second valve means can be carried out by restoring means, which basically load the second valve means into the closed state, and in particular when required can be overridden by other actuators.

It is preferably provided that, on reaching a first defined minimum temperature, the state of the second valve means is coupled to the state of the first valve means, in particular if both valve means are in the same state. This is particularly advantageous if coupling of the two states is possible when both valve means are in the closed state. Coupling may be achieved by a thermosensitive agent, in particular a bimetal element or an element made of a shape memory material. If the two valve means are coupled together, a changeover of the one valve means from the closed state into the unobstructed state has the effect of also changing over the other valve means from the closed state into the unobstructed state. At a defined first minimum temperature, it may thus be ensured that the valve passage is always opened as soon as a fall in the ambient temperature occurs.

Preferably, however, it is provided that, if the temperature falls below a second defined minimum temperature, the state of the second valve means is decoupled from the state of the first valve means. If, in particular, the second valve means is basically loaded into its closed state, for example by restoring means, provision may be made for the temperature-dependent decoupling to ensure opening of the valve passage only above the first and/or second defined minimum temperature or closing of the valve passage below the first and/or second defined minimum temperature.

During the rise in ambient temperature, energy from the surrounding environment is preferably absorbed and stored, wherein the stored energy is converted into kinetic energy during lowering of the ambient temperature and used to open the valve passage. In this way, it may be ensured that, despite falling temperature, and thus falling energy input, opening of the valve passage is made possible, without external energy being introduced in a defined manner or the need for electrochemical energy storage devices, such as batteries. The dispensing device may thus be substantially maintenance-free and operated completely autonomously. Action from outside is largely unnecessary, apart from possible refilling or replacement of the reservoir unit.

The invention further relates to a dispensing device, in particular suitable for use in a washer/dryer, it being possible to release an agent to be dispensed from the dispensing device in defined manner into a surrounding environment of the dispensing device, the dispensing device comprising a reservoir unit, for accommodating an agent to be dispensed, and a valve unit for defined opening and closing of a valve passage from the reservoir unit into the surrounding environment of the dispensing device, the valve unit comprising at least one first valve means, which may be changed over between an unobstructed state and a closed state, and a control unit for controlling the valve unit, the control unit comprising at least one thermosensitive actuator, which may bring about changeover of the first valve means as a function of an ambient temperature profile.

The dispensing device according to the invention is characterized in that a friction clutch is arranged between the thermosensitive actuator and the first valve element. The friction clutch may substantially exhibit a differential response characteristic.

Instead of the friction clutch, another transmission element with a substantially differential response characteristic may also be provided.

For the purposes of the present invention, a thermosensitive actuator is in particular understood to mean an actuator which outputs a specific control variable as a function of a temperature prevailing in the surrounding environment of the actuator or applied to the actuator. Such an actuator may for example be a bimetal element or made from a shape memory material. The control variable is here substantially proportional to the prevailing temperature. Through interposition of the friction clutch or of the transmission element with a substantially differential response characteristic, a control variable applied to the first valve element can be decoupled from the absolute output variable of the actuator. Instead, only the control variable applied to the valve element is determined by the change in the absolute output variable of the actuator. This may in other words mean that the valve element is loaded into the one state when the ambient temperature rises. Loading in the direction of the other state proceeds when the ambient temperature falls. The absolute temperature may in this case substantially be ignored. Transmission elements with a substantially linear response characteristic stand in contrast to this. If such a transmission element is used, the valve means would be loaded with a control variable which is substantially proportional to the output variable of the actuator and thus substantially proportional to the temperature. Linear transmission of the output variable as a control variable from the thermosensitive actuator to a valve means is described for example in WO 2008/012613 A2.

Through provision of the friction clutch or the transmission element with a substantially differential response characteristic, the state of the first valve means may be substantially decoupled from the absolute temperature of the surrounding environment and coupled to a fall or rise in the temperature. In this way, it is fundamentally possible to bring about opening or closure of the valve passage also or only as a function of a change in temperature. Through the provision of other actuators or valve means, an additional dependency on the absolute temperature may nevertheless remain possible.

The transmission element with a substantially differential response characteristic may also take the form of a slip-affected element. In particular, the friction clutch may be loaded by the thermosensitive actuator, providing the output variable thereof changes. If the first valve means has in this case already reached that state in which it is loaded by the friction clutch, further loading into this state occurs. However, said loading does not lead to summing of the forces applied or to integration of stresses, caused by a further change in the output variable of the actuator, since the friction clutch then slips, without further changing over the valve means. Should the temperature then fall again, the first valve means may immediately again be loaded substantially towards the other state, without the need first of all to dissipate summed or integrated stresses. This naturally also applies to the reverse case, i.e. in which first of all a temperature drop is provided, followed by a temperature rise. It should then be taken into account, for the purposes of the present invention, that thermosensitive actuators generally respond to temperature changes with a degree of delay. This has the advantage, however, that slight fluctuations in temperature do not lead immediately to a changeover of valve means into the respective other state. Temperature fluctuations may thus be disregarded. The advantages mentioned in regard to the friction clutch may also apply to other transmission elements with a substantially differential response characteristic.

The valve unit preferably comprises a second valve means, which may be changed over between an unobstructed state and a closed state. The second valve means may be at least in part independent of the first valve means. The second valve means may in this case be controlled as a function of other variables, in particular also of the absolute temperature. Through provision of the second valve means, which may also be in series with the first valve means or in another active connection with the first valve means, a complex control method may be implemented. A series connection of the valve means may result when the valve passage is opened, when both valve means are in their unobstructed state and when the valve passage is closed, when at least one of the valve means is in the closed state. A valve means may basically consist of an adjustable flow-interrupting object, in particular a disk or an object which may be locally displaceable. The valve means comprises an orifice or a hole, which may constitute part of the valve passage. The orifice may be brought into superposition with another orifice, in particular a stationary orifice or the orifice of another valve means. The respective orifices then overlap, such that the parts of the valve passage formed by the orifice are opened. A valve means in the form of a disk may in principle be rotationally or laterally displaceable.

The control unit preferably comprises a first energy storage unit, which may load at least one of the valve means into at least one of the states, in particular the unobstructed state. Such an energy storage unit may be formed by a thermosensitive actuator, which undergoes a change in shape during a temperature rise and is thereby charged, so to speak. When the temperature falls, elastic stresses arise, which load the actuator in the respective other direction. In this way, thermal energy is converted into potential energy and then into kinetic energy. Alternatively or in combination therewith, an energy storage unit may also be provided which takes the form of a restoring spring. The restoring spring may be tensioned by the activity of an actuator. When the actuator activity lessens, the restoring spring may load at least one of the valve means into another state. Provision is preferably made for the restoring spring to be of smaller dimensions than an actuator element which may counteract the restoring spring.

According to a first exemplary embodiment of the dispensing device, the control device comprises a second thermosensitive actuator, which as a function of an ambient temperature may couple the first valve means at least indirectly with that actuator which may load the first valve element into the unobstructed state. In this way, loading also of the second valve element may be brought about at least in part as a function of the change in temperature. Furthermore, coupling between first valve means and second valve means may be enabled. Coupling by the second thermosensitive actuator to the other actuator only takes place, however, when the ambient temperature is in a defined temperature range. The second thermosensitive actuator is preferably active, i.e. has a coupling effect, when the ambient temperature is higher than a first defined minimum temperature. The second thermosensitive actuator may preferably couple the first valve element synchronously with the second valve means.

According to a further developed second embodiment of the dispensing device, on the other hand, the control device is provided with just one thermosensitive actuator. The one thermosensitive actuator is then optionally coupled via intermediate elements to both valve means and may in this way influence the position of both valve means. In this respect, use of just one thermosensitive actuator results in a structural simplification.

The control unit preferably comprises only mechanical control components. Mechanical control components also include thermomechanical components. In this way, the device may exhibit a particularly simple and maintenance-free configuration. The supply of electrical energy or the provision of other energy storage means may be dispensed with.

The reservoir unit is preferably held removably on the dispensing device. This makes refilling easy. The reservoir unit may preferably be connected with a removable lid or base part.

The stated minimum temperatures always refer to the ambient temperature. The stated first and second minimum temperatures are not necessarily identical, but may be. Thus, the stated minimum temperatures may differ even with regard to identical components, in particular as a result of levels of inertia in their response to changes in temperature or as a result of hysteresis characteristic. A preferred minimum temperature is 40° C., preferably 45° C. In addition, one of the minimum temperatures is at least 20° C., preferably at least 40° C., below an operating temperature of the respective process (for example washing process, drying process). The first minimum temperature is preferably no lower than the second minimum temperature.

For the purposes of the invention, "changeover" into a state is understood to mean a change in state from an initial state (for example unobstructed state or closed state) into a target state (for example closed state or unobstructed state). Should the target state prevail even before changeover, "changeover" is also understood to mean maintenance of the target state.

For the purposes of the invention, "loading" into a state may bring about a "changeover" into the state, but does not have to, in particular when the respective valve means or the like is prevented from changing over by other loads or constraining forces.

FIG. 1 is a schematic representation of a dispensing device (10) according to the invention in the assembled state. The dispensing device (10) comprises a substantially cylindrical housing (11), which is closed by a base part (12) and a lid part (13). The lid part (13) comprises one or more orifices (14), by which the interior of the dispensing device (10) is connected fluidically with the surrounding environment (15). A sponge (16) is arranged inside the cylindrical housing (11), which sponge accommodates an agent to be dispensed. The sponge (16) is firmly connected to the base part (12). The base part (12) is screwed onto the cylindrical housing (11) and may be removed together with the sponge (16) for the purpose of refilling. The agent to be dispensed is for example a scent in liquid form, which is accommodated in the sponge (16) and may enter the surrounding environment (15) in gaseous form through the orifice (14) by diffusion through a membrane, not shown. The sponge (16) constitutes a reservoir unit.

The dispensing device (10) further comprises a plurality of disks (21, 22, 23), which constitute a valve unit (17). The valve unit (17) defines a valve passage. If the valve passage is open, agent to be dispensed may exit from the sponge (16) into the surrounding environment (15). If the valve passage is closed, no agent to be dispensed can exit from the sponge (16) into the surrounding environment (15). The valve passage is formed by orifices (26, 29, 34) in the disks (21, 22, 23).

Figure 2:
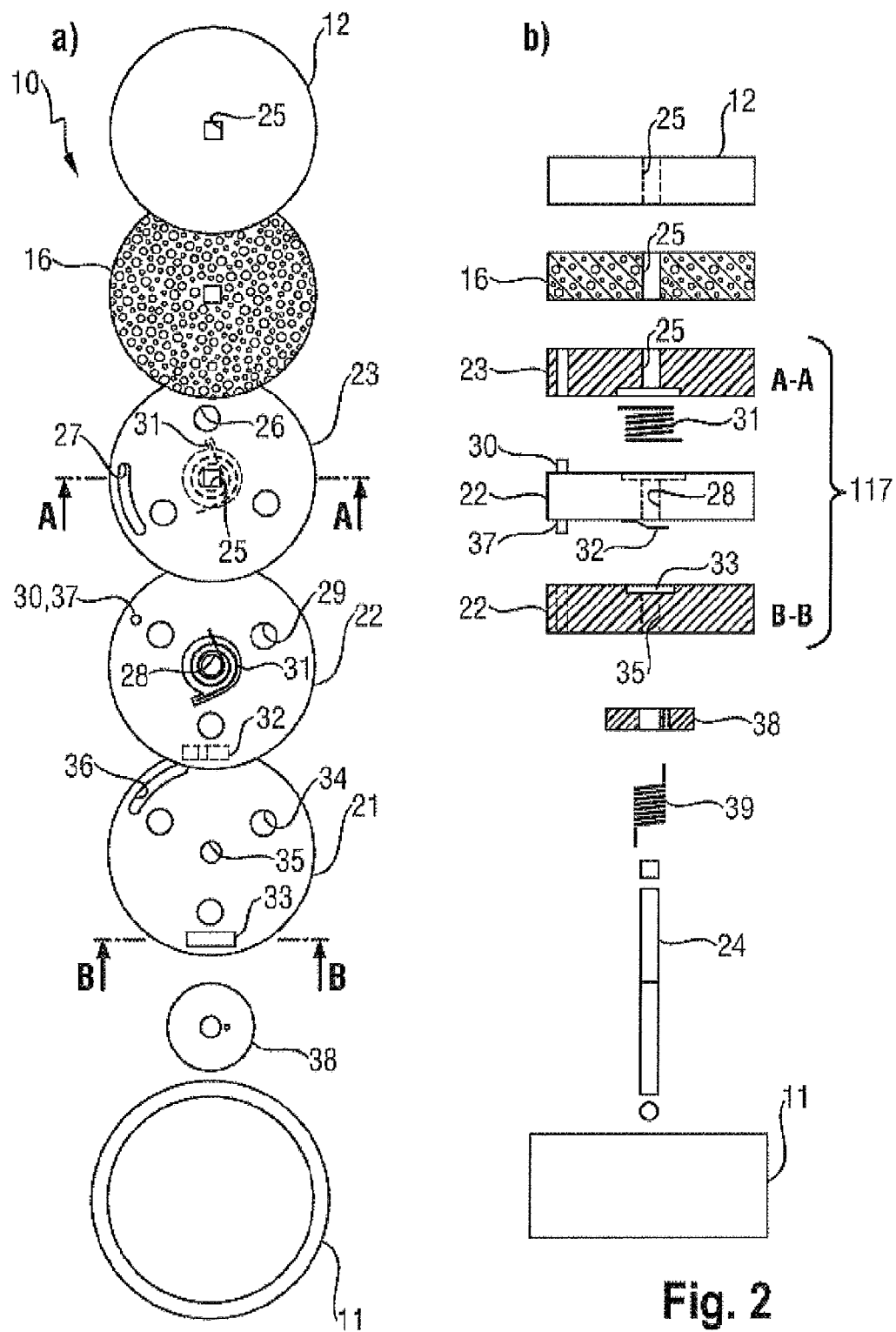
FIG. 2 is an exploded representation of the first embodiment of the dispensing device according to FIG. 1, with the components shown
 a) in plan view,
 b) in side view, partially in section.

The structure of the dispensing device (10) will be explained below with reference to FIG. 2. FIG. 2 shows the cylindrical housing (11) and the base part (12), which have already been described in relation to FIG. 1. In addition, the sponge (16) is shown, which is substantially cylindrical in shape, rests against the base part (12) and is framed circumferentially by the cylindrical housing (11). The valve unit (17) substantially comprises the three disks (21, 22, 23), which are circular in the present configuration and are rotatably displaceable. The third disk (23) adjoins the sponge (16). The third disk (23), the sponge (16) and the base part (12) each comprise a central opening (25) of angular cross-section. The sponge (16) and in particular the third disk (23) are held non-rotatably relative to the base part (12) by a journal (24), which likewise exhibits an angular cross-section, which substantially corresponds to the angular cross-section of the openings (25). The base part (12) is in turn connected non-rotatably with the cylindrical housing (11). In this respect, the third disk (23) and the sponge (16) are held non-rotatably within the dispensing device (10). The third disk (23) further comprises three circumferentially distributed orifices (26), which are parts of the valve passage. Agent to be dispensed may pass through the third disk (23) via the orifices (26). In addition, the third disk (23) comprises a slot (27), which extends in the circumferential direction and serves to guide a peg (30), which is mounted on the second disk (22), which is still to be described.

The second disk (22) comprises a central opening (28) of round cross-section. In this respect, the second disk (22) is held rotatably relative to the base part (12). Furthermore, the second disk (22) comprises three circumferentially distributed orifices (29), which in turn constitute part of the valve passage and via which agent to be dispensed may pass through the second disk (22). A peg (30) is provided, which protrudes off-center from the second disk (22) towards the third disk (23) and projects through the slot (27) in the third disk (23). The peg (30) and the slot (27) define relative rotation of the second disk (22) relative to the third disk (23). Furthermore, a substantially temperature-independent spiral spring (31) is provided, which rests both on the second disk (22) and on the third disk (23). A bimetal strip (32) is additionally mounted on the second disk (22). The bimetal strip (32) is arranged on the side of the second disk (22) remote from the third disk (23) and facing the first disk (21), which is yet to be explained.

The first disk (21) comprises three circumferentially distributed orifices (34), which are part of the valve passage and through which agent to be dispensed may pass. The first disk (21) is mounted rotatably by a central opening (35) of round cross-section. The first disk (21) comprises a slot (36), which extends circumferentially in the first disk (21). A peg (37) arranged on a side of the second disk (22) remote from the first disk (21) engages in the slot (36). Interaction of the slot (36) with the peg (37) defines the relative movement of the first disk (21) relative to the second disk (22).

Above a first defined minimum temperature the bimetal strip (32) may disengage and then protrude from the surface of the second disk (22). It may then engage in a locking groove (33) in the first disk (21) and thus couple the second disk (22) to the first disk (21), at least when the bimetal strip (32) is congruent with the locking groove (33) in the first disk (21). This is the case when the first disk (21) and the second disk (22) are each located in a defined position relative to one another, in which the orifices (29, 34) of the second and first disks are axially congruent.

On a side of the first disk (21) remote from the second disk (22), a friction disk (38) is provided, which interacts with a bimetal spiral spring (39). The friction disk (38) is connected frictionally with the first disk (21) and thus forms a friction clutch with the first disk (21). Rotation of the friction disk (38) may therefore bring about rotation of the first disk (21). The bimetal spiral spring (39) here rests against both the friction disk (38) and the lid part (13), which is not shown but is connected non-rotatably with the cylindrical housing (11). In this respect, rotation of the friction disk (38) may be caused by means of the bimetal spiral spring (39), if the bimetallic spiral spring (39) expands or contracts due to temperature. The bimetal spiral spring (39) may in principle also be replaced by an element of a shape memory material.

Figure 3:
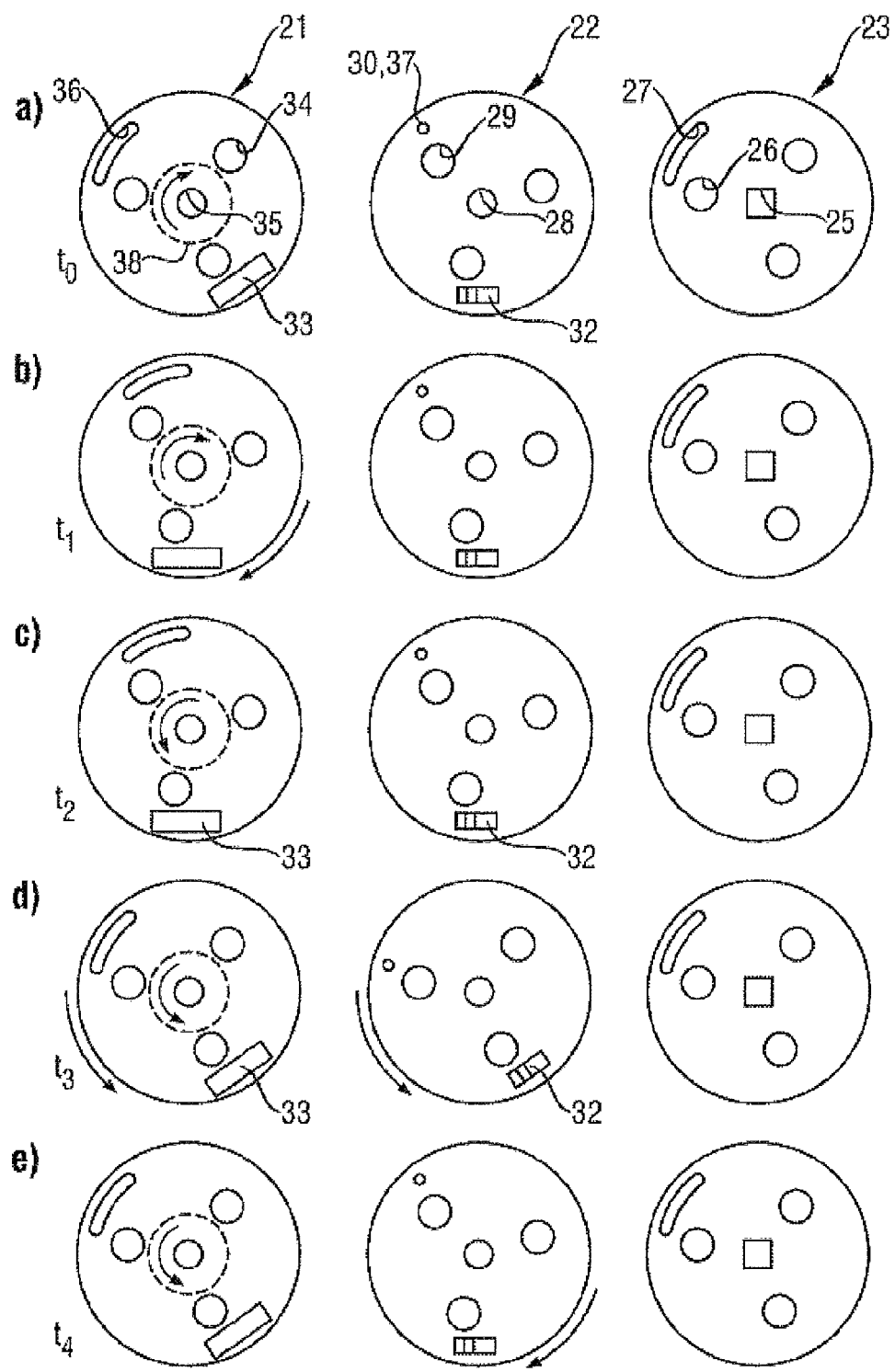
FIG. 3 is a plan view of valve means of the dispensing device according to FIG. 1 in different operating states.
Figure 4:
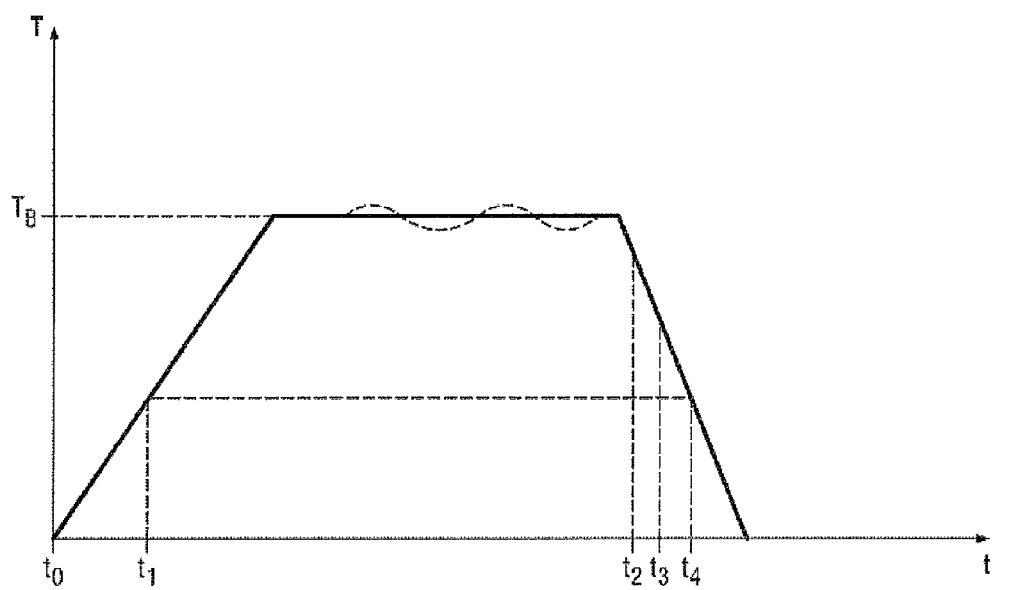
FIG. 4 shows the temperature profile of a process when the dispensing device according to FIG. 1 is used correctly.

The mode of operation of the dispensing device (10) is explained in greater detail with reference to FIGS. 3 and 4. In the various representations a to e in FIG. 3, the three disks (21, 22, 23) are each shown in different positions. In the first column the first disk (21) is shown in different positions. In the second column the second disk (22) is shown in different positions. The third column shows the third disk (23). Since the third disk (23) is held non-rotatably within the dispensing device (10), the third disk (23) is also always shown in the same position in FIG. 3. In the first column, the friction disk (38) is additionally shown by broken lines within the first disk (21), said friction disk (38) being concealed by the first disk (21) in plan view. The arrow shown within the friction disk (38) shown by broken lines indicates the direction of rotation of the friction disk (38), which is brought about by the bimetal spiral spring (39) in the event of a temperature rise or a temperature fall. The various orifices (34, 29, 26) in the three disks are additionally each also visible, these each being part of the valve passage. If these three orifices lie one above the other, the valve passage is open. If the orifices in at least one of the disks are not congruent with the orifices in another disk, the valve passage is closed.

In FIG. 3d the first disk (21) and the second disk (22) are each in an unobstructed position. This is clear from the fact that the orifices (34, 29) in the first and second disks are congruent with the orifices (26) in the third disk. In this illustration, the unobstructed positions are clear from the fact that the locking groove (33) and the bimetal strip (32) are located at around 5 o'clock. The valve passage is thus open.

In FIGS. 3b and 3c, on the other hand, the first disk (21) and the second disk (22) are in their closed positions. In this respect, orifices (34, 29) in the first disk (21) and the second disk (22) are not congruent with the orifices (26) in the third disk. In this illustration, the closed positions are clear from the fact that the locking groove (33) and the bimetal strip (32) are located at around 6 o'clock. The valve passage is thus closed.

In FIG. 3a, the first disk (21) is in its unobstructed position. However, since the second disk (22) is in its closed position, the valve passage is nevertheless closed. The same also applies to the position according to FIG. 3e.

A typical cycle of a washer/dryer, in which the dispensing device may be used, is described below with reference to FIG. 3, in which the various positions of the disks are visible, and to FIG. 4, which plots the temperature T throughout the drying process against the time $t_1$. FIG. 3a shows the valve position substantially at the starting point $t_0$ of the drying process. The temperature in the washer/dryer corresponds substantially to the ambient temperature of the washer/dryer, conventionally approximately 20° C. On an increase in the temperature in the washer/dryer, the bimetal spiral spring (39) begins to expand, which leads to torsion of the bimetal spiral spring (39). This drives the friction disk (38) in a clockwise direction, as indicated in FIG. 3a by the arrow. The first disk (21) is then still in its starting position, namely in the unobstructed position. However, since the second disk (22) is in its closed position, the valve passage is closed.

At the time $t_1$ the friction disk (38) has traveled a certain angular distance, driven by the bimetal spring (39), such that the first disk (21) has been turned clockwise by the frictional connection between the friction disk (38) and the first disk (21), specifically into the closed position thereof as shown in FIG. 3b. On a further increase in temperature, the bimetal spiral spring (39) drives the friction disk (38) on further. Further rotation of the first disk (21) by the friction disk (38) is not possible, however, since the first disk (21) is prevented from rotating further relative to the second disk (22) by the peg (37) of the second disk (22), which is held in the slot (36) in the first disk (21). The second disk (22) cannot be rotated further, since this is prevented by the peg (30) of the second disk (22) within the elongate hole (27) in the third disk (23) from rotating in the clockwise direction. In this respect, the closed positions of the first disk (21) and the second disk (22) are end positions, beyond which the respective disks (21, 22) cannot be moved.

Approximately at time $t_1$, a first defined minimum temperature is reached, which determines disengagement of the bimetal strip (32) in such a way that the bimetal strip (32) projects towards the first disk (21) and into the locking recess in the first disk (21). The disengaged bimetal strip is shown in FIG. 2b by solid lines, while the broken lines show the engaged bimetal strip (32). Since at time $t_1$ both the first disk (21) and the second disk (22) are in their closed positions and the locking groove (33) is congruent with the bimetal strip (32), the first disk (21) and the second disk (22) are coupled together. The positions shown in FIG. 3b represent the valve position at time $t_1$ and are retained over the subsequent drying process, during which the temperature reaches its operating temperature $T_B$. Various fluctuations in the temperature T, which are shown in FIG. 4 by broken lines, do not change anything about the positions of the disks (21, 22), since the bimetal elements (39, 32) are provided with a degree of inertia.

At time $t_2$ the temperature T within the washer/dryer drops. It is clear from FIG. 3c that the friction disk (38) then rotates counterclockwise, which is caused by cooling of the bimetal spring and thus by contraction of the bimetal spring (39). As before, however, the first disk (21) and the second disk (22) are coupled together by the bimetal strip (32). At time $t_3$ (FIG. 3d) the friction disk (38) has changed the first disk (21) over from its closed position into its unobstructed position. Due to the first disk (21) being coupled to the second disk (22) by the bimetal strip (32), at the same time the second disk (22) is also changed over from its closed position into its unobstructed position. The valve passage is then opened. Agent to be dispensed can pass from the sponge (16) through the valve passage into the surrounding environment of the dispensing device, namely into the interior of the washer/dryer.

FIG. 3e shows the position of the disks (21, 22) on further cooling at time t4. The fall in temperature has the effect that the bimetal strip (32) engages again, so undoing the coupling between the first disk (21) and the second disk (22). Since the second disk (22) is loaded by the restoring spring (31) basically into the closed position thereof, the second disk (22) is then changed over into the closed position. In this way the valve passage is closed again.

The positions of the disks according to FIG. 3e at time $t_4$ correspond exactly to the positions of the disks according to FIG. 3a at time $t_0$. In this respect, at time $t_4$ the dispensing device again reaches its starting position. A fresh drying process may be started without the device having to be moved back into its starting position by external actuation, for example by pressing a reset button.

Although at each of times $t_4$ and $t_1$ the minimum temperature T is plotted as approximately the same, it may however also be the case that disengagement at time $t_4$ takes place only at a lower temperature than engagement at time $t_1$, caused for example by a certain hysteresis characteristic of the bimetal strip.

Figure 5:
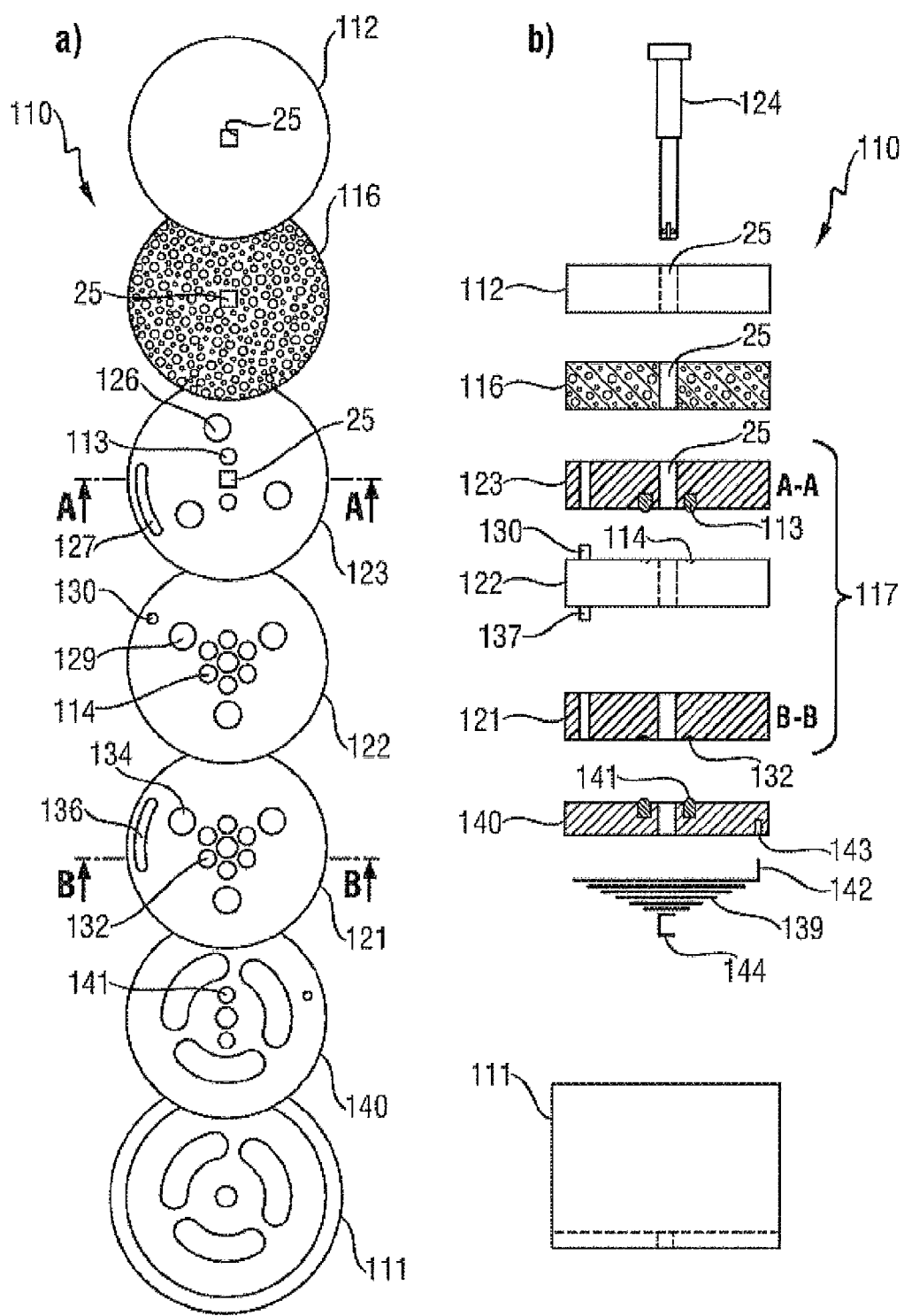
FIG. 5 is an exploded representation of a second embodiment of a dispensing device with the components shown
 a) in plan view,
 b) in side view, partially in section.
Figure 6:
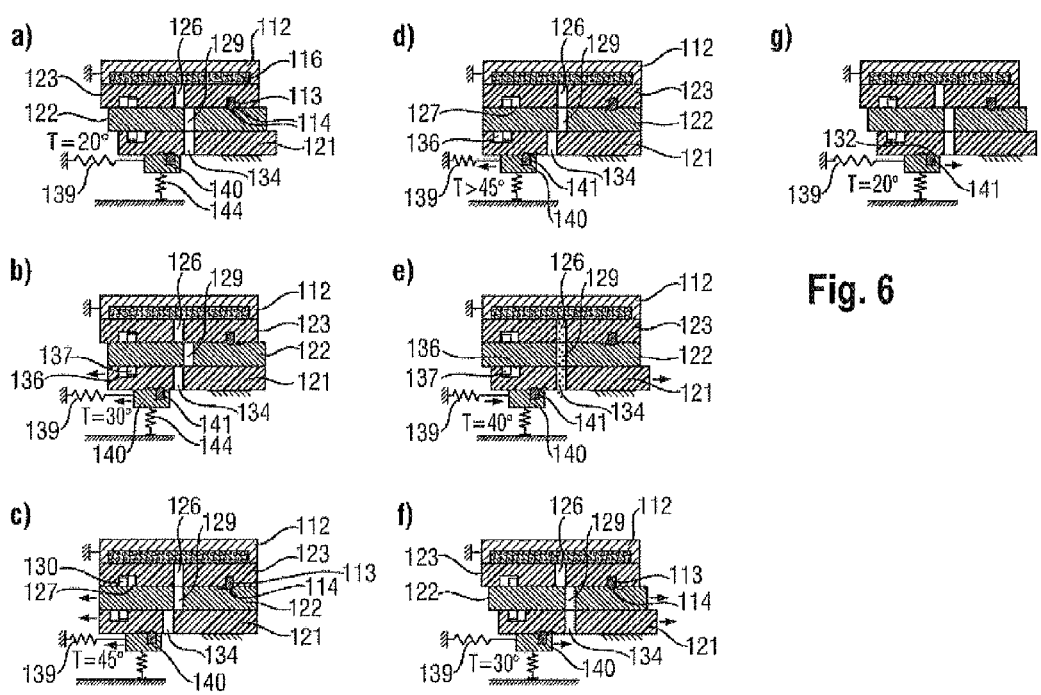
FIG. 6 is a schematic diagram, with a plurality of temperature-dependent individual figures a)-g), of the mode of operation of the dispensing device of FIG. 4.

The design structure and function of a second embodiment of the dispensing device (110) according to the invention are described with reference to FIGS. 5-6. The second variant of the dispensing device (110) has a comparable basic structure to the first embodiment of the dispensing device (10) according to FIGS. 1-3, but in contrast thereto has just one thermosensitive element (139). The second dispensing device (110) specifically preferably comprises disks (112, 121, 122, 123, 140) consisting of plastics, which are arranged on the journal or the shaft (124). In this case, the disk (112) as base part (112) forms, together with a cylindrical sleeve (111), the housing of the dispensing device (110), which surrounds the other elements of the dispensing device (110). The disks (123 and 112) are here fixed non-rotatably, for example interlockingly, on the shaft or the journal (124) while the other disks (121, 122, 140) are arranged rotatably on the shaft (124). In this case, the disks (121, 122, 123) form the valve unit (117), which controls temperature-dependent product release by the dispensing device (110). Similar to the first dispensing device variant (10), a substantially disk-shaped sponge element (116) is arranged between the base part (112) and the third disk (123), which sponge element may be impregnated with an agent to be dispensed, in particular with scent. The base part (112) and the third disk (123) are each terminated at the circumference by the cylindrical housing part (111), such that scent can only exit through the respective orifices (126, 129, 134) in the three valve disks (121, 122, 123). The second valve disk (122) here bilaterally comprises pegs (130, 137), which interact with corresponding slots (127, 136) in the first (121) and third disks (123), as described above. In this way, an interlocking connection is produced between the disks (121, 122, 123), which restricts the rotational motion of the individual disks relative to one another to defined angles of rotation corresponding to the slot dimensions. In addition, in the axial direction of the shaft (124) there is a frictional connection between the three disks (121, 122, 123) of the valve unit (117). Specifically, axially pretensioned spherical pressure pieces (113) are provided for this purpose on the third disk (123), which engage in associated locking wells (114) in the second disk (122). Furthermore, further axially pretensioned spherical pressure pieces (141) are provided on a fourth disk (140), which engage in associated locking wells (132) in the first disk (121). The spherical pressure pieces (113, 141) basically bring about rotational coupling of the individual disks (121, 122, 123, 140) within the framework of the rotational possibilities defined by the slots (127, 136). A higher axial spring pretension is applied to the spherical pressure pieces (141) of the fourth disk (140) than to the spherical pressure pieces (113) of the third disk (123). The thermosensitive element in the form of a thermo-bimetal spiral spring (139) is finally also fixed with one end to the fourth end disk (140). The thermo-bimetal spiral spring (139) engages with a first end (142) interlockingly in a well (143) in the fourth disk (140). With its second end (144) the thermo-bimetal spring (139) engages interlockingly in the shaft (124). In the event of a temperature change in the environment surrounding the dispensing device (110), the thermo-bimetal spiral spring (139) thus rotates the fourth disk (140) relative to the shaft (124). If the thermo-bimetal spiral spring (139) is helical in form, it is additionally possible for the individual disks (112, 121, 122, 123, 140) to be pressed slightly together axially to increase tightness.

In principle, the entire disk arrangement (112, 121, 122, 123, 140) is accommodated within a cylindrical housing sleeve (111). Additional protection of the disk arrangement (112, 121, 122, 123, 140) from ambient conditions, in particular within a washer/dryer, is achieved by embedding the housing sleeve in a resilient envelope, not shown, for example a resilient ball. In this way, inter alfa undesired impacts on the dispensing device (110) are damped.

The mode of operation of the dispensing device (110) will now be explained schematically with reference to the schematic diagram in FIGS. 6a)-g). The individual FIGS. 6a)-g) show the disk package (112, 116, 121, 122, 123, 140) of the dispensing device (110) in different temperature states. The disk package (112, 116, 121, 122, 123, 140) is compressed in the process by means of an axial compression spring (144), which acts on the fourth disk (140). In addition, the thermo-bimetal spiral spring (139) acts on the fourth disk (140) in the way already described.

FIG. 6a) illustrates the starting position of the disk package (112, 116, 121, 122, 123, 140) at room temperature, i.e. for instance 20° C. At this temperature the thermo-bimetal spiral spring (139) is relaxed, such that the orifices (129, 134) in the first and second disks (121, 122) are not aligned axially with the orifices (126) in the third disk (123). In this respect, no product accommodated in the sponge (116) can exit into the surrounding environment of the dispensing device (110).

In the event of an increase in temperature, as illustrated in FIG. 6b), the thermo-bimetal spiral spring (139) shortens and thus moves the fourth disk (140) to the left in FIG. 6b). Since the first disk (121) is coupled with the fourth disk (140) via at least one spherical pressure piece (113), the first disk (121) is also moved too to a similar degree, until the slot (136) in the first disk (122) comes to a stop circumferentially against the peg (137) on the second disk (122). The orifices (126, 129, 134) in the three disks (121, 122, 123) are also not aligned at this temperature of for instance 30° C., such that it is still not possible for any product awaiting release to exit.

Further heating to a temperature of approx. 45° C. leads to continued shortening of the thermo-bimetal spiral spring (139). Consequently, in addition to the fourth disk (140) and the first disk (121), in FIG. 6c) the second disk (122) also moves to the left due to the position of the peg (137) in the slot (136), wherein, once a defined limit force has been overcome, the spherical pressure piece (113) of the third disk (123) moves on in a circumferential direction by one locking well (114) in the second disk (122) until the peg (130) of the second disk (122) comes to a stop circumferentially in the associated slot (127) in the third disk (123) (see FIG. 6c). Even at this temperature level, the orifices (126, 129, 134) in the three valve disks (121, 122, 123) are not aligned, so meaning that, as before, no product awaiting release can exit from the dispensing device.

A continued temperature rise to above 45° C. finally leads to additional shortening of the thermo-bimetal spiral spring (139), such that the thermo-bimetal spiral spring (139) exerts a force in the circumferential direction (to the left in FIG. 6d)) on the fourth disk (140). Since the valve disks (121, 122, 123) are already at their limits in the circumferential direction due to the slot guides (127, 136) and cannot be moved any further, the lower spherical pressure piece (141) consequently slips in the circumferential direction into the nearest associated locking well (132), exceeding a defined limit force as it does so. In this way, the thermo-bimetal spiral spring (139) also becomes relaxed. Even in this temperature range >45° C. the orifices (126, 129, 134) in the valve disks (121, 122, 123) are not aligned, meaning that no product awaiting release can exit into the surrounding environment.

As cooling starts, for instance to a temperature of 40° C., after a high temperature level of >45° C. has been reached, the thermo-bimetal spiral spring (139) expands again and in the process moves the fourth disk (140) back in the opposing circumferential direction, i.e. to the right in FIG. 6e). The first disk (121) coupled with the fourth disk (140) via the spherical pressure piece (141) is moved at the same time in the circumferential direction, until the first disk (121) comes to a stop via the slot (136) in the circumferential direction against the associated peg (137) of the second disk (122). During this relative rotational motion between first (121) and second disk (122), it is necessary merely to overcome the friction moment between the disks (121, 122). Once the relative displacement has taken place between first disk (121) and second disk (122) as a result of a drop in temperature, the orifices (126, 129, 134) in the disks (121, 122, 123) of the valve unit are aligned, such that product awaiting release can exit into the surrounding environment of the dispensing device (see FIG. 6e)).

With further cooling to a temperature level of approx. 30° C., the thermo-bimetal spiral spring (139) expands further, such that the fourth (140) and also the first (121) and second disks (122) move in the opposite circumferential direction, to the right in FIG. 6f). In the course of this disk displacement, after a defined limit force has been exceeded, the upper spherical pressure piece (113) of the third disk (123) slips on by one associated locking well (114) in the second disk (122). As a result, the orifices (126, 129, 134) in the valve disks (121, 122, 123) are no longer axially aligned and release of the product to be released is thus stopped.

On still further cooling, for instance to room temperature, i.e. approx. 20° C. (as shown in FIG. 6g)), and continued expansion of the thermo-bimetal spiral spring (139), the lower spherical pressure piece (141) finally slips back into the initial locking well (132). The starting state of the dispensing device (110) is thus reproduced and said device is ready for a further use cycle.

LIST OF REFERENCE NUMERALS 10, 110 Dispensing device
11, 111 Cylindrical housing
12, 112 Base part
13 Lid part
14 Orifices
15 Surrounding environment
16, 116 Sponge
17, 117 Valve unit
21, 121 First disk
22, 122 Second disk
23, 123 Third disk
24, 124 Journal/shaft
25 Openings of square cross-section
26, 126 Orifices
27, 127 Slot
28 Openings of round cross-section
29, 129 Orifices
30, 130 Peg
31 Spiral spring
32 Bimetal strip
33 Locking groove
34, 134 Orifices
35 Openings of round cross-section
36, 136 Slot
37, 137 Peg
38 Friction disk
39, 139 Bimetal spiral spring
113, 141 Spherical pressure piece
114, 132 Locking wells
140 Fourth disk
142 End portion
143 Well
144 Compression spring While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A dispensing device (10, 110), for releasing an agent from the dispensing device (10, 110) in defined manner into a surrounding environment (15) of the dispensing device (10, 110), the dispensing device comprising:
   a.) a reservoir unit (16, 116), for accommodating the agent to be dispensed,
   b.) a valve unit (17, 117) for defined opening and closing of a valve passage (26, 29, 34, 126, 129, 134) from the reservoir unit into the surrounding environment (15) of the dispensing device (10, 110), the valve unit (17, 117) comprising at least one first valve means (21, 121) which may be changed over between an unobstructed state and a closed state, and c.) a control unit for controlling the valve unit (17, 117), the control unit comprising at least one thermosensitive actuator (39, 139) which is capable of bringing about a changeover of the at least one first valve means (21, 121) as a function of an ambient temperature profile, and a friction clutch, formed by a friction disk (38) interacting with at least one thermosensitive actuator (39, 139) wherein the friction disk (38) is in frictional connection with the at least one first valve means (21,121).

2. The dispensing device according to claim 1, wherein the thermosensitive actuator takes the form of a bimetallic element is produced from a shape memory material.

3. The dispensing device according to claim 1, wherein the valve unit (17, 117) comprises a second valve means (22, 122) which may be changed over between an unobstructed state and a closed state.

4. The dispensing device according to claim 1, wherein the control unit comprises at least one first energy storage unit (39, 31, 139) which is capable of putting at least one of the valve means (21, 22, 121, 122) into at least one of the states.

5. The dispensing device according to claim 1, wherein the control device comprises a second thermosensitive actuator (32) which, as a function of an ambient temperature, is capable of coupling the second valve means (22) at least indirectly with the least one thermosensitive actuator (39) which is capable of putting the first valve means (21) into the unobstructed state.

6. The dispensing device according to claim 5, wherein a second thermosensitive actuator (32) is capable of coupling the first valve means (21) synchronously with the second valve means (22).

7. The dispensing device according to claim 1, wherein the reservoir unit (16, 116) is mounted removably on the dispensing device (10, 110).

* * * * *